June 24, 1930.  H. E. KANEHL  1,766,437
ATTACHMENT FOR INTERNAL COMBUSTION ENGINES
Filed June 6, 1927
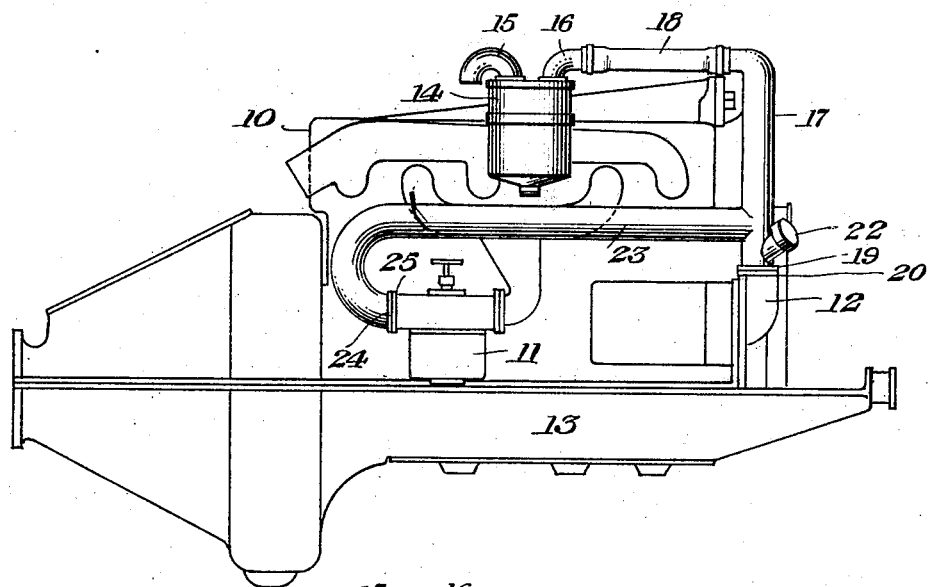
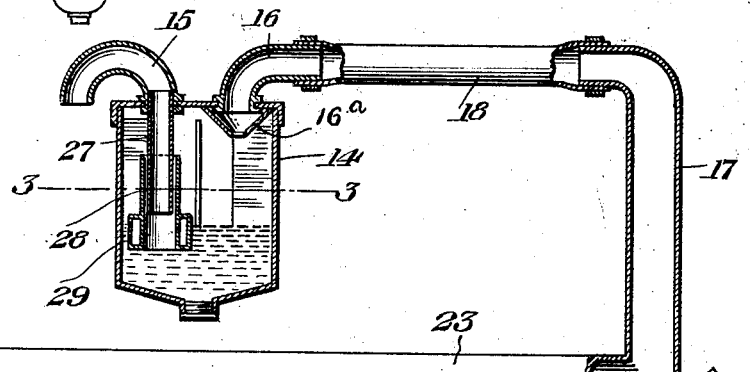
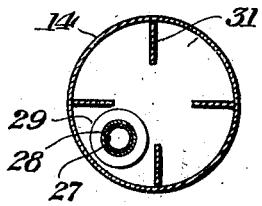
Hubert E. Kanehl
INVENTOR
BY Victor J. Evans
ATTORNEY Patented June 24, 1930

1,766,437

UNITED STATES PATENT OFFICE

HUBERT E. KANEHL, OF SOLOMON, KANSAS

ATTACHMENT FOR INTERNAL-COMBUSTION ENGINES

Application filed June 6, 1927. Serial No. 196,886.

This invention relates to attachments for internal combustion engines and has for an object the provision of means for filtering and moistening air before it enters the carbureter so as to increase the efficiency of the fuel mixture.

Another object of the invention is the provision of means controlled by the air for drawing vapor from the engine crank case to reduce loss of oil, aid lubrication and utilize vapor from gasoline entering the crank case to further increase the efficiency of the engine and reduce fuel consumption.

With the above and other objects in view, the invention further includes the following novel features and details of construction to be hereinafter more fully described, illustrated in the accompanying drawings and pointed out in the appended claim.

In the drawings:—

Figure 1 is a side elevation showing a gasoline engine equipped with the invention.

Figure 2 is an enlarged sectional view partly in elevation of the invention per se.

Figure 3 is a section on the line 3—3 of Figure 2.

Referring to the drawings in detail wherein like characters of reference denote corresponding parts, the reference character 10 indicates generally an internal combustion engine having a carbureter 11 and a breather pipe 12 which provides means for introducing oil to the crank case 13.

The invention includes an air filter which is formed of a casing 14 having an air inlet pipe or throat 15 and an air outlet pipe 16. This last mentioned pipe is in communication with one end of a vertically disposed pipe 17 by means of a pipe section 18, the latter being preferably of a flexible character and having its opposite ends secured over the ends of the pipes 16 and 17. The lower end of the pipe 17 is adapted to enter the mouth of the breather pipe 12 and is surrounded by a stop flange 19 and a gasket 20. A filler spout 21 extends from the pipe 17 and is normally covered by a cap 22 so that oil may be introduced into the crank case without removing the pipe 17.

Extending from the pipe 17 and communicating with the latter at a point spaced from the lower end thereof is one end of a pipe 23. The opposite end of this pipe communicates with the air intake of the carbureter 11 and is provided with a stop flange 24 and a gasket 25.

The filter is adapted to contain a suitable supply of water and extending into the filter casing from the pipe 15 is a pipe which includes a stationary section 27 and a slidable section 28, the latter being provided at its lower end with a float 29 so as to maintain a uniform suction through the water filter. The filter is further provided with baffle plates which act to prevent the water from splashing about within the float casing 14.

Operation of the engine will draw air into the carbureter 11 for mixture with the gasoline or other fuel, the air passing inward through the pipe 15 and through the water within the casing 14. The air is thus thoroughly washed and moistened, the moistened air passing out of the filter through the pipe 17. As the air must pass downward into the mouth of the breather pipe 12, a suction is created within the crank case 13 and oil vapor is drawn into the pipe 17 and through the pipe 23 into the carbureter and the engine. This oil vapor acts to lubricate the walls of the engine cylinder and the valves and in the event of leakage of gasoline past the pistons of the engine, the vapor from this gasoline is also drawn into the engine cylinders and forms a part of the fuel mixture. In addition, the suction created within the crank case 13 will act to reduce leakage of oil due to worn bearings or bad gaskets and will further tend to reduce the quantity of oil passing upward beyond the pistons in engines having worn piston rings.

It is preferred to surround the inner end of the outer pipe 16 with a hollow substantially conical baffle $16^a$, which has an opening in its lower restricted end. This baffle prevents the suction of the engine from drawing water from the filter casing should the water be unduly agitated by reason of travel over rough roads.

The invention is susceptible of various changes in its form, proportions and minor details of construction and the right is herein reserved to make such changes as properly fall within the scope of the appended claim. For example, slight changes may be necessary in the arrangement of the pipes 17 and 23 to adapt the invention to different makes of engines.

Having described the invention what is claimed is:—

An air filter for internal combustion engines comprising a casing adapted to contain water, vertically disposed circumferentially spaced baffles extending inwardly from the wall of the casing, an air intake pipe having one end in communication with the atmosphere and its opposite end extending downwardly within the casing between the spaced baffles, a suction pipe having one end in communication with the top of the casing between the baffles and spaced from the intake pipe, and means at the other end of the suction pipe for communication with the carbureter and the crank case breather pipe of an engine.

In testimony whereof I affix my signature.

HUBERT E. KANEHL.